United States Patent [19]

Rowe

[11] 4,095,812
[45] Jun. 20, 1978

[54] BICYCLE DRINKING APPARATUS

[76] Inventor: V. Lopez Rowe, 2680 Saturn Ave., Huntington Park, Calif. 90255

[21] Appl. No.: 756,813

[22] Filed: Jan. 5, 1977

[51] Int. Cl.² ............................................. B62J 11/00
[52] U.S. Cl. ............................. 280/289 R; 224/32 R; 239/33
[58] Field of Search .......... 280/289 A, 289 R, 289 H; 224/30 A, 30 R, 32 R, 39, 41; 242/86, 87 R; 239/33; 215/1 A

[56] References Cited

U.S. PATENT DOCUMENTS

| 581,767 | 5/1897 | Powers | 239/33 |
| 942,306 | 12/1909 | Clarke | 215/1 A |
| 2,907,534 | 10/1959 | Benstein | 242/86 |
| 3,189,171 | 6/1965 | Miller | 239/33 |
| 3,487,858 | 1/1970 | Hanback | 138/178 |
| 3,840,153 | 10/1974 | Devlin | 224/32 R |
| 3,981,166 | 9/1976 | Madonna | 224/32 R |
| 4,009,810 | 3/1977 | Shook | 224/32 R |

*Primary Examiner*—Robert R. Song
*Assistant Examiner*—Donn McGiehan
*Attorney, Agent, or Firm*—Lawrence Fleming

[57] ABSTRACT

An apparatus installed on a bicycle to permit the rider to drink water or other liquid while riding. The apparatus comprises an extensible drinking straw which communicates with a water bottle. In a preferred form, the straw is a flexible tube coiled in a retracting reel mounted on the upper horizontal bar of the bicycle frame, with the water bottle mounted below the saddle. A form of retracting reel is shown which requires no rotating seal, but permits the flexible tubing to remain in one continuous length. An alternative form comprises a length of retractile coiled tubing in a lidded container mounted within reach of the rider. Another form employs a telescoping drinking straw of rigid tubing.

4 Claims, 9 Drawing Figures

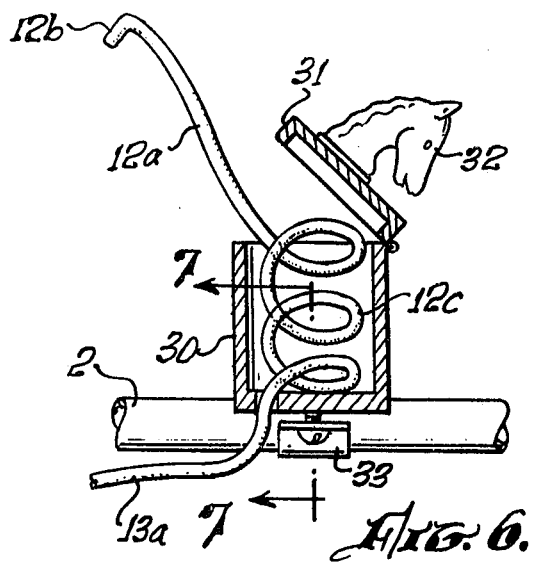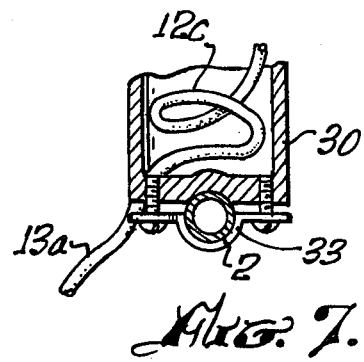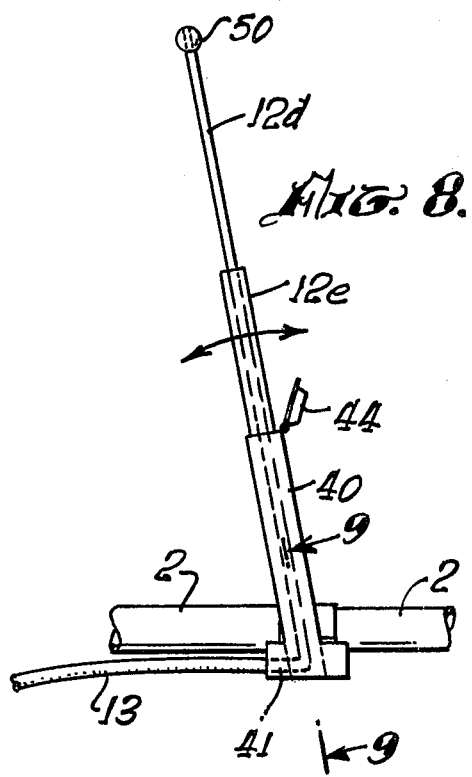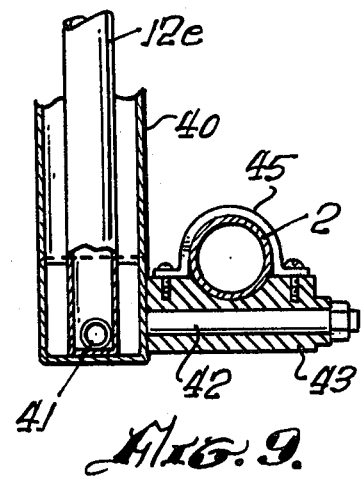

BICYCLE DRINKING APPARATUS

BACKGROUND OF THE INVENTION

In racing and other bicycling situations where the rider cannot conveniently stop and dismount at his discretion, there is at present no safe means available for the rider to drink when thirsty. It is known to use a water bottle held by a clip; the removal and replacement of the bottle are, however, distracting, and its use in drinking tends to interfere with the rider's balance and with his view of the road.

There is hence a need for an improved drinking means for bicyclists which does not interfere with vision or balance, nor require the rider to grope around or to fumble with detachable objects.

BRIEF SUMMARY OF THE INVENTION

The basic elements of this invention are a water (or other liquid) container and a retractable drinking straw, mounted on a bicycle. The drinking straw is preferably mounted on the upper forward portion of the bicycle's frame, convenient to the rider's hand. The water bottle or container may be mounted out of the way, as to a frame member under the saddle, and connected to the drinking straw by a suitable length of tubing.

In this specification, the term "straw" is used to mean any tubular element, rigid or flexible, which a person uses for drinking by inserting one end into the mouth and sucking.

A preferred form of the invention comprises a flexible straw on a retracting reel. The reel is preferably mounted on the upper horizontal frame member of the bicycle a short distance behind the handle bars. The water bottle may be mounted below the saddle. The straw may be made of soft commercial vinyl tubing about 3.2 mm in inside diameter and 4.7 mm outside. Similar tubing may connect the reel to the water bottle.

The reel is preferably housed in a suitable box clamped to the bicycle frame member. The box may have an opening with a hinged cover through which the end of the flexible plastic tubing straw is pulled. Alternatively, the outer end of the straw may be equipped with a mouthpiece which covers the opening in the box, and the mouthpiece may be equipped with a hinged sanitary cap.

The reel may be of the known type which has a rotating fluid seal between its hub and the supply line leading to the water bottle. Another form of reel eliminates the rotating seal or joint and employs instead a freely-coiled auxiliary length of tubing to accommodate a few revolutions of the reel. In this embodiment of the invention, a single unbroken length of tubing may run from the mouthpiece to the inside of the water bottle, eliminating any interference with suction flow due to air leaks.

In another embodiment, the reel assembly and the water bottle are in a unitary assembly.

In another, the drinking straw is made of telescoping sections of rigid tubing.

In another, the drinking straw is of self-coiled retractile plastic tubing which withdraws itself into a container which is equipped with a hinged cap.

IN THE DRAWINGS

FIG. 6 is a side sectional view of another alternative form of straw and housing, with a self-coiled retractile straw;

FIG. 7 is a partial sectional view on line 7—7 of FIG. 6;

FIG. 8 is a side view of another alternative form employing a telescoping straw; and FIG. 9 is a partial sectional view on line 9—9 of FIG. 8.

DETAILED DESCRIPTION

Figure 1:
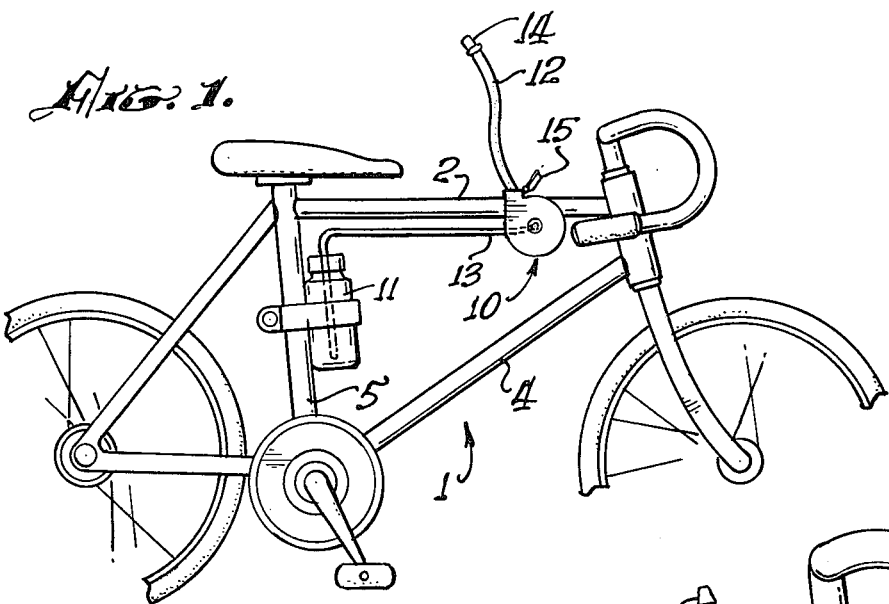
FIG. 1 is a partial side view of a bicycle equipped with a drinking system according to the invention.

FIG. 1 shows a portion of an ordinary bicycle on which is installed a drinking apparatus according to the invention. This form comprises a reeled tube in a reel housing 10, and a water bottle 11. Reel housing 10 is attached to the upper horizontal frame member 2 of a bicycle which is indicated generally at 1. The rectractable drinking straw is indicated as a portion of flexible tubing 12, which terminates in a mouthpiece 14. A sanitary hinged cap 15 covers the opening in reel housing 10. Another portion of tubing 13 connects the tubing in reel housing 10 with the water bottle 11. Bottle 11 is clamped or otherwise suitably secured to bicycle frame member 5, in a suitable out-of-the-way location, as below the saddle.

It will be seen that a rider of bicycle 1 need only withdraw the mouthpiece 14 in order to drink, flipping open the sanitary cap 15. When through drinking, he need only let go of the mouthpiece, and the reel will automatically draw the straw portion 12 back into the box or housing, out of the way.

Figure 2:
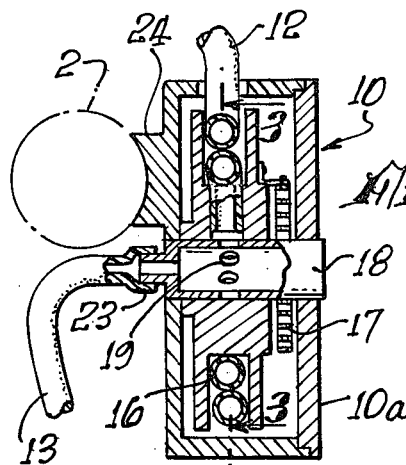
FIG. 2 is a cross-sectional view of a reel.

FIG. 2 shows in section a form of reel assembly suitable to the above purpose. The retracting tubing 12 is wrapped in a few turns around a reel 16 which has a suitable groove or slot to fit the tubing. When the tubing straw 12 is pulled out, the reel 16 rotates against the restoring torque of a spiral or other suitable form of spring 17. When the end of straw 12 is released by the rider, it is thrus drawn back in.

A rotary seal or joint may be provided by a hollow shaft 18 with several small holes 19, in cooperation with a larger radial hole 22 in reel 16 (shown best in FIG. 3), into which the inner end of tubing straw 12 is secured, as by glue. The hollow shaft 18 is stationary, being connected to the housing 10a; the reel 16 revolves around it. The end of the water supply portion 13 of the water tubing may be attached to the hollow shaft 18 as at 23, FIG. 2. The outer (right-hand) end of shaft 18 is, of course, closed.

Reel housing 10a may be mounted to the bicycle frame member 2 by means of a suitable-fitting portion 24 and conventional clamping means (not shown), FIG. 2.

Figure 3:
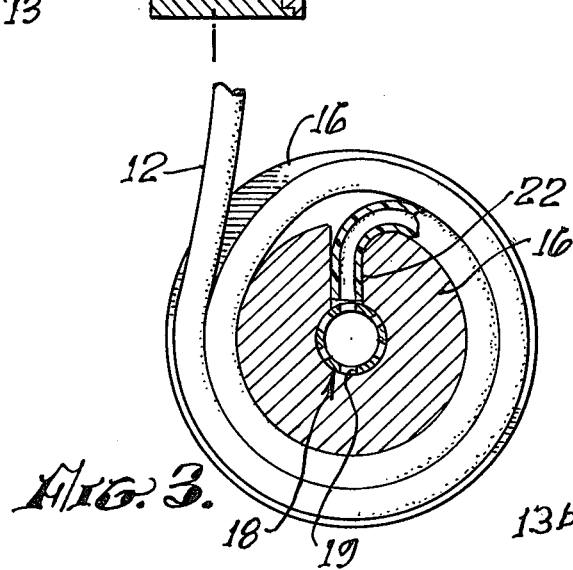
FIG. 3 is a sectional view along line 3—3 of FIG. 2.

FIG. 3 shows in section how the tubing 12 wraps around the reel 16, and shows better the relation between hole 22 and the perforated hollow shaft 18, 19. The extendable length of flexible straw 12 need be only about 50 cm. This length can be coiled up in two turns of about 8 cm. diameter.

Figure 4:
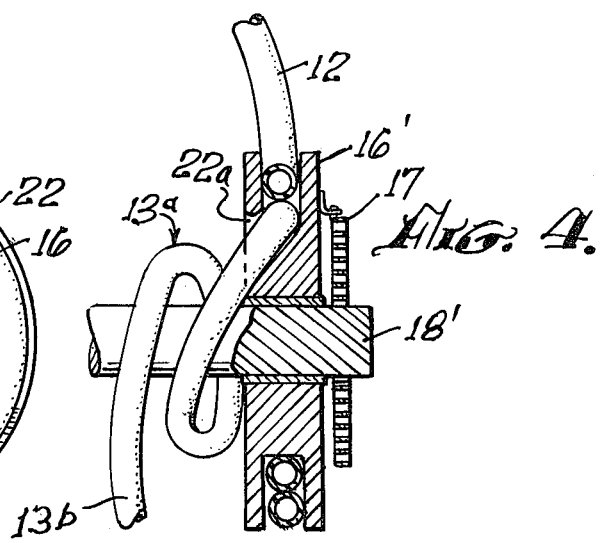
FIG. 4 is a cross-section of an alternative form of reel.

Referring to FIG. 4, a reel 16' of modified form is shown, which rotates on a solid shaft 18' without any rotary fluid coupling means. In the modification of FIG. 4, the water supply end portion 13a of the tubing exits from the reel 16' at a side hole 22a, and coils in two or three free turns outside the reel, to terminate in a portion 13b leading to the water bottle 11 (not shown in FIG. 4). This configuration accommodates two turns of the reel without difficulty. It has the advantage that the tubing 12, 13a, 13b may be continuous all the way from the mouthpiece to the inside of the water bottle 11. This is helpful, because small air leaks in the lower portions of the tubing system tend to interfere with the sucking up of liquid through the straw. As in FIG. 3, the spiral or other suitable spring 17 of FIG. 4 operates to automatically retract the tubing 12 when the bicycle rider lets go of it.

Figure 5:
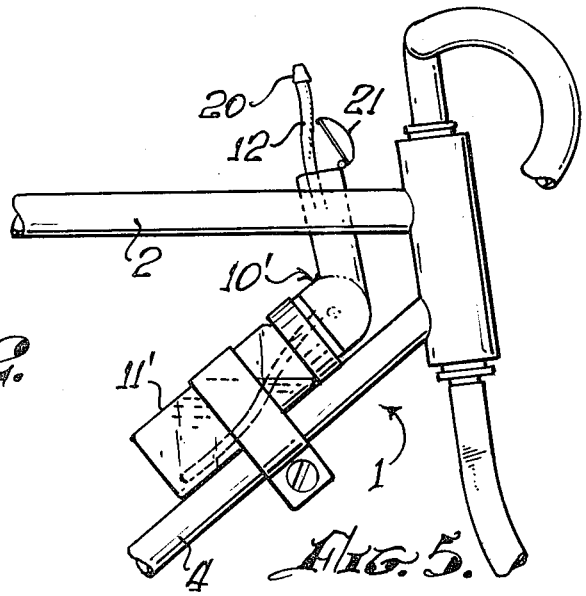
FIG. 5 is a side view of an alternative form of the invention.

FIG. 5 shows a modification wherein the housing 10' for the retracting straw 12 is attached directly to the water bottle 11', simplifying the installation. Here the unitary assembly 10', 11' is clamped to the diagonal frame member 4 of the bicycle 1. The drinking straw portion 12 of flexible tubing may have a plain mouthpiece 20, and the opening in the housing may be provided with a hinged sanitary cap indicated at 21. The housing, indicated generally at 10', may contain a retracting reel means, such as shown in FIGS. 2-4, or alternatively the tubing 12 may be retractably self-coiled like the tube 12a, 12c of FIG. 6 (described below).

FIG. 6 is a side sectional view of another form of retractile drinking straw assembly. Here, the straw portion 12a is of self-coiling retractile plastic flexible tubing, which retracts in the manner of self-coiling telephone cords and the like. The tubing is contained, when not in use, in a housing 30 fitted with a hinged lid 31. The drinking end of the straw 12b may be permanently bent at about a right angle as shown to hook into the bicycle rider's mouth so that he may drink while using both hands to steer. A handle for the lid 31 may be in the form of an ornamental animal or other figure, such as the horse's head 32.

The container or housing 30 may be attached to a bicycle frame member 2 by a suitable recess on the bottom of container 30 and a sheet metal clamp 33, shown better in FIG. 7.

Another modification of the invention is shown in FIGS. 8 and 9. Here, the drinking straw is made of rigid tubing in the form of telescoping sections 12d, 12e, etc., which telescope down into a housing 40. The top section 12d may terminate in a ball-like mouthpiece 50. The housing 40 is preferably equipped with a cap 44. When the straw 12d, etc. is fully telescoped, the mouthpiece 50 would lie just inside the domed cap 44, suitable for grasping when the cap is opened.

This telescoping straw assembly, FIGS. 8 and 9, is preferably made so that it can be tilted fore and aft, both for convenience in drinking and for laying down out of the way when it is not in use. To this end, FIG. 9, a pin 42 may be welded or otherwise attached to the side of housing 40, and run through a suitable hole in a mounting block 43. The mounting block 43 also has a cylindrical recessed portion which fits around the lower portion of bicycle frame member 2, and is held thereto by a clamping strip 45 in known manner.

The tubing 13 which leads to the water bottle may be connected to an elbow 41 which connects to the lower end of the telescoping drinking straw 12d, 12e, etc.

I claim:
1. A drinking apparatus for a bicycle, comprising:
   a generally cylindrical container for a potable liquid;
   a clamp means to attach said container to a frame member of a bicycle;
   a drinking straw of flexible suction tubing;
   a reel housing and a rotatable reel therein, said straw being retractably stored and wound on said reel;
   rotary spring means in said housing biasing said reel to retract said straw;
   a mouthpiece on the free end of said straw;
   a hinged sanitary cap on said housing covering said mouthpiece when said straw is retracted; and
   a fluid-tight rotary connection between the inner end of said straw and said container.
2. An apparatus as in claim 1, wherein:
   said container is jar-like, and
   said housing comprises a jar top portion removably attached directly to the mouth of said container,
   said container and housing forming a unitary apparatus.
3. An apparatus as in claim 2, wherein:
   said rotary connection comprises about two to four turns of said tubing wound outside of and adjacent said reel, said turns winding and unwinding with the rotation of said reel,
   the innermost end of said turns being attached to a stationary point, and
   said tubing extending continuously without interruption from said mouthpiece to said container.
4. A drinking apparatus for a bicycle comprising:
   a container for a potable liquid;
   means to attach said container to the frame of a bicycle;
   a hollow drinking straw in telescoping sections collapsible into an elongated housing;
   a flexible suction tube connecting the lower end of said straw to said container,
   said lower end being secured inside the base portion of said housing;
   a hinged cap on the top of said housing;
   a block element with clamp means to clamp said element to a top horizontal frame member of said bicycle;
   a hole in said block element extending horizontally and perpendicular to said frame member;, and
   a pin attached to said base portion of said housing and extending perpendicularly to said housing and fitted rotatably into said hole,
   said housing thereby being pivotable to the rear on said pin between a horizontal position for storing and a vertical position for use in drinking.

* * * * *